April 14, 1964     E. P. NEMES     3,129,353
MULTIPLE RADIATION SOURCE MICROSCOPE
Filed May 17, 1960     3 Sheets-Sheet 3
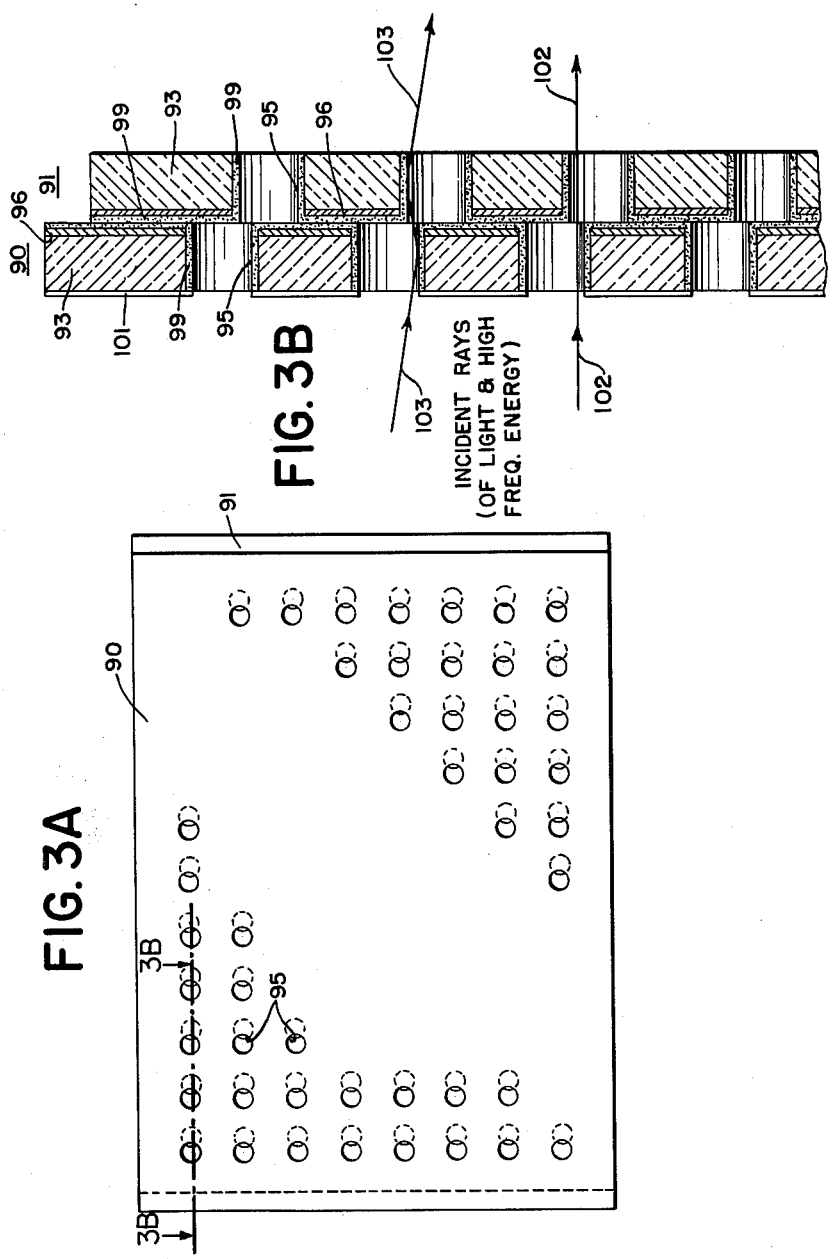
INVENTOR.
ELMER PIERRE NEMES

United States Patent Office 3,129,353
Patented Apr. 14, 1964

3,129,353
MULTIPLE RADIATION SOURCE MICROSCOPE
Elmer Pierre Nemes, % Mrs. Jennings, 611 Oakwood
Ave., Los Angeles, Calif.
Filed May 17, 1960, Ser. No. 29,641
18 Claims. (Cl. 315—10)

This invention relates to microscopes and more particularly to a microscope in which the specimen being examined is bombarded with energy from a plurality of radiation sources which produce different wavelengths of radiation.

This application is a continuation-in-part of my copending application Serial No. 559,478, filed January 16, 1956, now abandoned.

In many instances it is desirable to examine both the internal and external structure of a particular specimen. Typical examples of such examinations are in the fields of medical and micro-biological research, metallurgical research, etc. In these fields, it often happens that the specimens which are to be examined are too small to be seen by the naked eye. Therefore, a suitable device, such as a microscope, must be provided to accomplish the examination. The microscope magnifies the specimen being examined to a degree such that worthwhile observations can be made.

Two examples of microscopes presently in use are the optical microscope and the electron microscope. In both of these types of microscopes the two criteria which determine their effectiveness are magnification and resolution. Magnification may be defined as the ratio of the size of an image formed by an optical system to the size of the object. The term resolution is most frequently used to denote the smallest extension which a magnifying instrument is able to separate or the smallest change in wavelength which a spectrometer can differentiate.

In an optical microscope the degree of magnification and resolution which can be obtained is limited by the physical properties of the lens system and also by the wavelength of the single beam of energy illuminating the specimen. The magnifying power of an electron microscope is limited by the size of the bombarding electrons. Most electron microscopes are characterized as having a magnifying power slightly greater than 200,000×. Actually, the true resolving power of the electron microscope is limited to about 60,000×, after which point photographic enlargement is employed. The photographic enlargement magnifies the image but contributes nothing to resolution. In fact, the photographic enlargement reveals the loss of resolution and increases distortion. Also, the magnified image produced by an electron microscope is in many instances only a shadow of the specimen being examined. The image appears in black and white and much of its detail is lost.

The present invention is directed to a microscope which is highly efficient and which overcomes many of the problems and limitations present in optical and electron microscopes. In accordance with the present invention the specimen being examined is simultaneously bombarded with energy from several sources, the energy being of different wavelengths. The system has high magnification powers and extremely good resolving powers.

Utilizing the system of the present invention, photographs have been obtained of the internal structure of viruses, such as polio, cancer, multiple sclerosis, muscular dystrophy and also of toxins and anti-toxins developed by viruses. Through the resolution of internal structure, photographs of the internal structure of materials, such as aluminum oxide, germanium, magnesium and latex also have been obtained. It has also been possible to examine and photograph the internal structure of crystals such as quartz and germanium.

It is therefore an object of this invention to provide a microscope which has high magnification and resolution powers.

Another object of this invention is to provide a microscope in which the specimen being examined is simultaneously bombarded with a plurality of wavelengths of energy.

A further object of this invention is to provide a microscope system having a tube which produces a plurality of waves of energy of different wavelengths.

Other objects and advantages of the present invention will become more apparent upon consideration of the following specification and annexed drawings, in which:

FIGURE 3A and 3B are detailed views of the correcting screens of the image reproducing tube of FIGURE 2.

Figure 1:
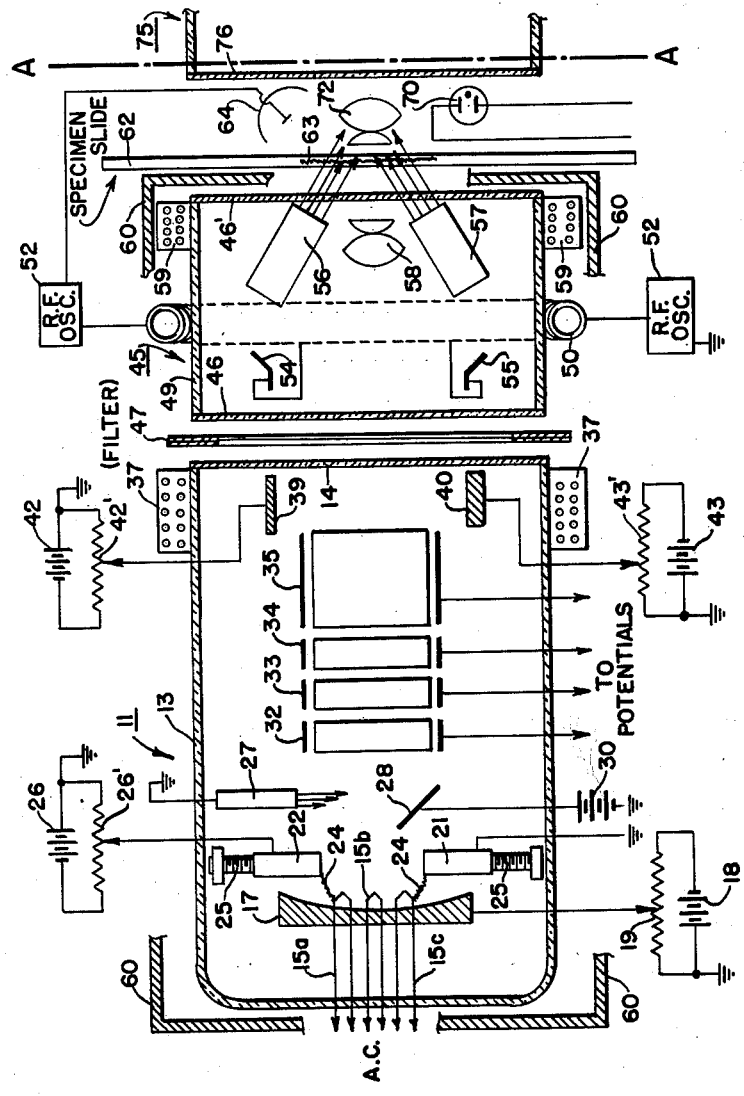
FIGURE 1 is a cross sectional, partially schematic representation, of a portion of the microscope system.

Referring to FIGURE 1, the first unit of the microscope system is the multiple radiation source tube 11. The tube 11 is formed with a substantially cylindrical outer wall 13 which has secured to one end thereof a quartz window 14. The quartz window 14 is secured in such a manner that it is capable of maintaining a partial or very low vacuum within the tube 11.

Located within the tube 11 are a plurality of filaments 15a, 15b and 15c which are circularly wound and mounted concentrically on a suitable heat resistance form, such as mica (not shown). The filaments 15a, 15b, 15c are connected to a source of direct or alternating current potential, for example, 117 volts A.C. As the filaments are heated they are caused to give off light in the visible wavelengths due to the incandescent effect.

Located behind the filaments 15a, 15b and 15c is a concave mirror 17 which is used to focus the visible light produced by the filaments 15. The mirror 17 is preferably made of a metal, such as rhodium. The mirror 17 may be compared to a shaped focusing electrode of a cathode ray tube. As shown, the mirror 17 is connected to a source of negative potential 18 through a voltage divider 19. As will subsequently be described, the mirror 17 serves as a focusing electrode due to this negative potential.

Located adjacent the mirror 17 are two electrodes 21 and 22 which act as a source of energy of higher frequency than the energy produced by the filaments 15. The electrodes 21 and 22 are preferably formed of materials which exhibit an electronegativity effect. In a preferred form of the invention, the electrode 21 is made of gold and the electrode 22 of platinum. These electrodes are connected to a respective filament 15 by means of a suitable connection 24. A reaction occurs between electrodes 21 and 22. This reaction is started by the heat produced by the incandescence of the filaments 15 and by a potential difference which is supplied from a suitable source shown as a battery 26 and voltage divider 26'. Once the reaction is started it is self-sustaining. The nature of this self-sustaining action is an emission by the difference in electronegativity between the gold electrode 21, the platinum electrode 22 and the impurities contained therein. Briefly described, an electronegative element is one which has a relatively great tendency to attract electrons whereby the bond energy of its linkage with another and different atom is found to exceed the mean of that found in linkages between the two pairs of identical atoms.

In effect, the materials forming the electrodes 21 and 22 are also caused to emit electrons due to the thermionic effect produced by the filaments 15 and the electric field set up by subsequent accelerating and focusing grids. The exact wavelength of the energy emitted by the electrodes 21 and 22 is determined by the type of metal used for the electrodes, the distance between the electrodes, the temperature applied, and the adjacent electric fields present. The wavelength of the energy emitted by the reaction between the electrodes 21 and 22 is shorter than that produced by the filaments 15 but longer than that which would be produced by alpha, beta, or gamma particles.

In order to have some control over the wavelength of energy produced by the electrodes 21 and 22 they are preferably made adjustable with respect to each other. In the preferred form of the invention, the electrodes 21 and 22 have screw mounts 25 which protrude through the housing 13. The screw mounts are brought out through suitable seals in the housing 13 which maintain the vacuum within the tube 11. The electrodes 21 and 22 may also be mounted, as shown on screws which have magnetic tips. These magnetic screws are adjusted from the outside of the envelope of the tube 11.

Due to the potential on the mirror 17 it also serves to focus the energy produced by the reaction between the electrodes 21 and 22 toward the output end 14 of the tube 11. This effect is well known, and no further description is needed.

A source 27 is provided to emit alpha, beta and gamma particles. The source 27 may, for example, be a radioactive element, such as radium or a radioactive isotope which is capable of emitting these particles. The particles emitted from the radioactive source 27 are directed toward a reflecting element 28. A suitable source of potential, shown by the battery 30, is connected to either the gun 27 or the reflector 28 so that the potential therebetween is sufficient to accelerate the alpha, beta and gamma particles to approximately $10^6$ electron volts. The spacing between source 27 and the reflector 28, the potential difference, and the shape of the reflector 28 are chosen so that the alpha, beta and gamma particles emitted by the source 27 are directed toward the window 14 at the end of the tube 11. Some of the particles and other radiation having sufficient energy will pass through the thin, transparent quartz window 14.

In a preferred form of the invention, the reflector 28 is made of a suitable metal such as tungsten which is coated with molybdenum, platinum, gold, rhodium, magnesium, aluminum or beryllium. As a general constructional guide, the total molecular weight of the tungsten structural metal and the coating metal should be as high as possible and the ratio of the molecular weights be kept as low as possible, with the coating having the lower molecular weight. It should be realized that other arrangements may be utilized, if desired.

A series of accelerating electrodes, control grids, and focusing electrodes 32, 33, 34 and 35 are provided in order to accelerate, focus and control the energy which is emitted by the electrodes 21 and 22. These grids are connected to the necessary sources of potential (not shown) and are provided with variable control elements (not shown), if desired. Since such elements are well known in the cathode ray tube field, further explanation of their operation is unnecessary.

The radiation which is produced by the filaments 15, the electrodes 21 and 22 and the radioactive source 27 contains all frequencies from visible light rays up to the rays emitted by the alpha, beta and gamma particles. The wavelengths produced by each of the sources of energy modulates the wavelengths produced by the other sources so that the final wavelengths emitted by the tube 11 has the sum and difference of the wavelengths of all the sources.

Located at the end of the tube 11 adjacent the quartz window 14 is a magnetic focus coil 37 and a set of deflection plates 39 and 40. The focus coil 37 is connected to a suitable source of current (not shown) which is sufficient to provide a magnetic field on the inside of the tube 11.

The deflection plates 39 and 40 are connected to sources of direct current potential, illustratively shown as the batteries 42 and 43, by respective adjustable voltage dividers 42' and 43'. This arrangement provides the proper deflecting potentials for the deflecting electrodes 39 and 40.

In a preferred form of the invention, the deflecting plates 39 and 40 are respectively made of gold and platinum, the same materials as the electrodes 21 and 22. While it is not necessary to have the specific materials mentioned for the plates 39 and 40, it is desirable to have two metals with differing electronegativity. For best operation of the tube 11, the metals forming the deflecting plates 39 and 40 should be of the same material as those forming the electrodes 21 and 22. It has been found that by using the same metals for the deflecting plates as used for the electrodes better control over the energy emitted by the electrodes 21 and 22 can be obtained. It is also preferred to use metals for the electrodes 21 and 22 and for the deflecting plates 39 and 40 which absorb oxygen with an increase in temperature and give off oxygen with a decrease in temperature. Many such metals exist and can be used. For a more complete description of this cooling effect, reference is made to my Patent 2,850,661, which also describes some constructional details of the tube 11. As shown in that patent, the tube 11 may also be provided with a cooling fluid by suitable cooling coils.

In order to obtain the best mode of operation for the tube 11, while the mass of the materials forming the deflecting plates 39 and 40 is not too critical, it has been determined that an optimum ratio of the masses exists. The optimum ratio is that of the two materials shown, wherein the ratio is 1.01 of the gold deflecting plate 39, to 1.5 for the platinum deflecting plate 40.

The focusing coil 37 serves to deflect the alpha and beta radiation produced by the radioactive source 27 so that it is directed out through the quartz window 14 after being accelerated in the tube 11. The gamma particles are undeflected by the coil 37 but these particles have sufficient energy to travel down the length of the tube 11 and leave through the quartz window 14. The deflecting plates 39 and 40 focus the energy produced by the electrodes 21 and 22 and have no effect on the alpha, beta and gamma radiation. As previously pointed out, by suitably charging the mirror 17 it can be made to serve as a focusing electrode for the energy emitted by the electrodes 21 and 22.

The tube 11 may also be filled with a gas such as helium, argon, nitrogen, xenon, or mixtures thereof. Due to the energy produced by electrodes 21 and 22 and the potential difference therebetween, the gases in the tube are ionized and radiation in the ultra violet spectrum as well as ions are produced. This ultra violet energy and the ions are also present at the quartz window 14. Therefore, as explained, the tube 11 is capable of producing energy encompassing the range from the ultra violet to the gamma wavelengths.

The multiple wavelength radiation is directed from the quartz window 14 at the output of tube 11 to the input of a condenser 45. The condenser 45 has an outer housing 49 with quartz windows 46 and 46' at the ends thereof. A slot is left between the tube 11 and the condenser 45 to allow the insertion of a filter 47, which is preferable interchangeable. The filter 47 may be any one of any number of types. For example, gold and silver leaf of a thickness of 1/10000 of an inch; second, a transparent filter, such as quartz; third, an infrared filter constructed of carborundum or any other suitable material; fourth, a blue filter. In a preferred form of the invention, the filters are supported by quartz on both sides and mounted on a motor driven wheel which has one position open for a neutral filter. The neutral filter is either an aperture in the motor driven wheel or else it is formed of black carbon.

Located around the outer housing 49 is a coil 50 which is supplied with alternating current at radio frequencies by a suitable radio frequency oscillator 52. The oscillator 52 produces a signal having a frequency between 200 and 30,000 megacycles. The frequency of the oscillator is preferably adjustable. The exact frequency used in any one case is determined by the speciment being examined. Any of the well known types of radio frequency oscillators capable of producing oscillations at the needed frequencies may be utilized, the particular type of oscillator forming no part of the present invention.

Connected to the coil 50 is a set of deflecting plates 54 and 55 which are located within the housing 49. The deflecting plates 54 and 55 are supplied with radio frequencies energy from the coil 50 and this energy modulates the appropriate wavelengths of energy from the tube 11. The resolution of the microscope system can be controlled within limits by varying the frequency of the modulating energy produced by the oscillators 52 and also by controlling the intensity of the signal produced by these oscillators.

Also, located within the condenser 45 are a set of lenses 58. The lenses are preferably of quartz and are used to focus the visible and ultra-violet light rays emitted by the tube 11. These light rays were originally focussed onto the lens 58 by the mirror 17 which is shaped to have the proper focal length.

A pair of radioactive sources 56 and 57 are also mounted within the condenser 45. The radioactive-sources contain any suitable radioactive material or isotope which is capable of emitting alpha, beta, and gamma rays. The radiation emitted by the guns 56 and 57 is modulated by the energy from the tube 11 thereby producing another range of sum and difference radiation frequencies.

For high resolution work the sources 56 and 57 are desirable. It is also possible to eliminate the sources 56 and 57 and instead coat the lens system 58 and the quartz window 46' with a radioactive substance which emits alpha, beta, and gamma rays. The primary radiation from the tube 11 interacts with the radiation emitted by the radioactive substance coated on the window 46' and the lens 54 to produce a modulated spectrum of radiant energy. In general, the additional alpha, beta and gamma radiation provided by the sources 56 and 57, or the lens 58 and the coated quartz window 46', allows more minute structure of a specimen to be resolved.

Mounted around the outer housing 49 of condenser 45 is a focusing coil 59 which is supplied with energy from a suitable source. The focusing coil 59 serves a purpose similar to the coil 37 which is mounted around the tube 11, namely, to focus the alpha and beta radiation as well as the radiation produced by the electrodes 21 and 22 of the tube 11. As previously stated, the gamma radiation from the tube 11 as well as the gamma radiation produced by the elements of the condenser 45 possesses sufficent energy and is suitably focused to impinge upon the specimen being examined.

As shown in FIGURE 1, the complete assembly of tube 11 and condenser 45 is enclosed by a shield 60. The shield 60 is made of a suitable material, such as lead, and is of a thickness to prevent any radiation from harming an operator who is in the vicinity of the microscope.

The specimen slide 62 on which the specimen being examined is mounted as shown at 63, is located adjacent the window 46'. The slide 62 is preferably mounted on a movable stage, whose distance from the window 46' can be adjusted. This provides additional control for the system. The slide 62 is made of quartz glass or other similar material which allows short and long wavelengths of radiation to pass therethrough. In order to prepare a specimen for examination by the microscope, standard techniques are followed. For example, when a metal specimen is to be examined, the metal is ground into a fine powder which is held on the specimen slide 62 between two plates. When a liquid or gas is to be examined, the gas is placed within a suitable container. If desired, the gas may be ionized. It should be noted that the specimen slide 62 may be mounted within the shield 60 if the shield is provided with an appropriate opening.

An antenna 64 irradiates the specimen under examination with radio frequency energy. The antenna receives its energy from the oscillator 52, which as previously pointed out, is adjustable either continuously or in steps from 220 megacycles to 30,000 megacycles. The energy supplied to the antenna 64 has a relatively high intensity and is beamed directly onto the specimen being examined by focusing it with a parabolic dish or other suitable means. The energy from the antenna 64 serves to agitate the specimen being examined and enable it more readily to emit energy. The radiant energy from the antenna 64 also filter-modulates the energy bombarding the specimen being examined.

As can be seen, the specimen on the slide 62 is bombarded with energy from a plurality of sources having a plurality of different wavelengths. Each of the wavelengths emitted by a specific source interacts with the other wavelengths and modulates it to produce sum and difference frequencies of energy.

According to the best theoretical explanation presently available, the microscope system operates as follows. As is well known, there are a certain number of chemical elements. These elements are listed on any periodic table. Every particle of matter, whether solid, liquid, or gas is composed of atoms of one or more of the chemical elements, and is either a mixture or a compound of the elements.

In classical physics, in which the Rutherford model of the atom is used, it is considered that each atom is formed by a nucleus carrying a positive charge about which revolve, in orbits, a number of electrons carrying negative charges. Thus, in the simplest case of a hydrogen atom, a single electron revolves in an orbit about a nucleus carrying a charge which is equal but opposite in effect to the charge on the electron.

It has been postulated by Bohr that an electron may revolve in one of a set of particular orbits, but not in any orbit, and that an electron has a specific energy for a given orbit. According to Bohr, when an electron in one of the orbits is supplied with energy from an external source it can be raised to another orbit. Going back to its original orbit, the electron emits a quantity of energy $hv$, where $h$ is Planck's constant and $v$ is the frequency of the spectrum line of the energy emitted. Hence when an electron of an atom is in its normal or lowest orbit and is given energy equivalent to the energy of the next orbit, the electron can be raised from the normal to the second Bohr orbit. When this is done and the electron is shifted from one Bohr orbit to another, it is said that the atom is excited or in an excited state. For example, when a hydrogen atom has its electron in the normal or first Bohr orbit, the atom is said to be normal, or in the normal state; when the electron is in the second Bohr orbit, the atom is said to be in the first excited state; when the electron is in the third Bohr orbit, the atom is said to be in the second excited state; and so on. The potentials necessary to knock the electrons of an atom from one Bohr orbit to another are known as excitation or radiation potentials, the frequency and the energy of the radiation potential being directly related.

When the electron of the excited atom falls back to the first Bohr orbit, a quantum of energy of a certain frequency is emitted. Thus by bombarding an atom with the proper excitation potential, an atom can be made to emit a quantum of energy, the frequency of which is determined by its atomic structure and by the energy of the external source. The latter determines to which orbit the electron is moved.

Excitation potentials for different materials vary and are determined both mathematically and empirically. For example, the radiation or excitation potentials for the normal and first excited states for the hydrogen atom are approximately 10.2 and 12.1 electron volts. When the electron falls back to the normal orbit from the first and second excited states, quanta of energy having respective wave lengths of 1210 Angstroms and 1019.8 Angstroms are emitted. The radiation potentials and the wavelengths of the emitted quanta for other elements may also be calculated or experimentally determined, and many of these are listed in available handbooks.

In accordance with the principles of operation of the invention, the specimen which is being examined is bombarded with a plurality of sources of energy of different wavelengths. One of these sources is energy at a frequency which approximates the frequency of one or more of the radiation potentials of the material forming the specimen. This radiation is produced by a first source of short wavelength sources, such as the radioactive sources 27, 56 and 57. This energy is in turn modulated by energy from a second source of a longer wavelength, such as that produced by the filaments 15, the ionization of the gases in tube 11, and the oscillators 52. The energy from the short wavelength radiation source impinging upon the specimen causes the atoms forming it to be excited, and emit quanta of energy of a frequency which is dependent upon the frequency of the energy of the first source. The energy from the second source serves to spread out the frequency of the emitted energy over a spectrum of frequencies. This spectrum of frequencies when translated to lower frequency visible light occupies a band of colors in the visible light range. Therefore, the specimen being examined is caused to emit a spectrum of energy which lies within a certain range.

Figure 2:
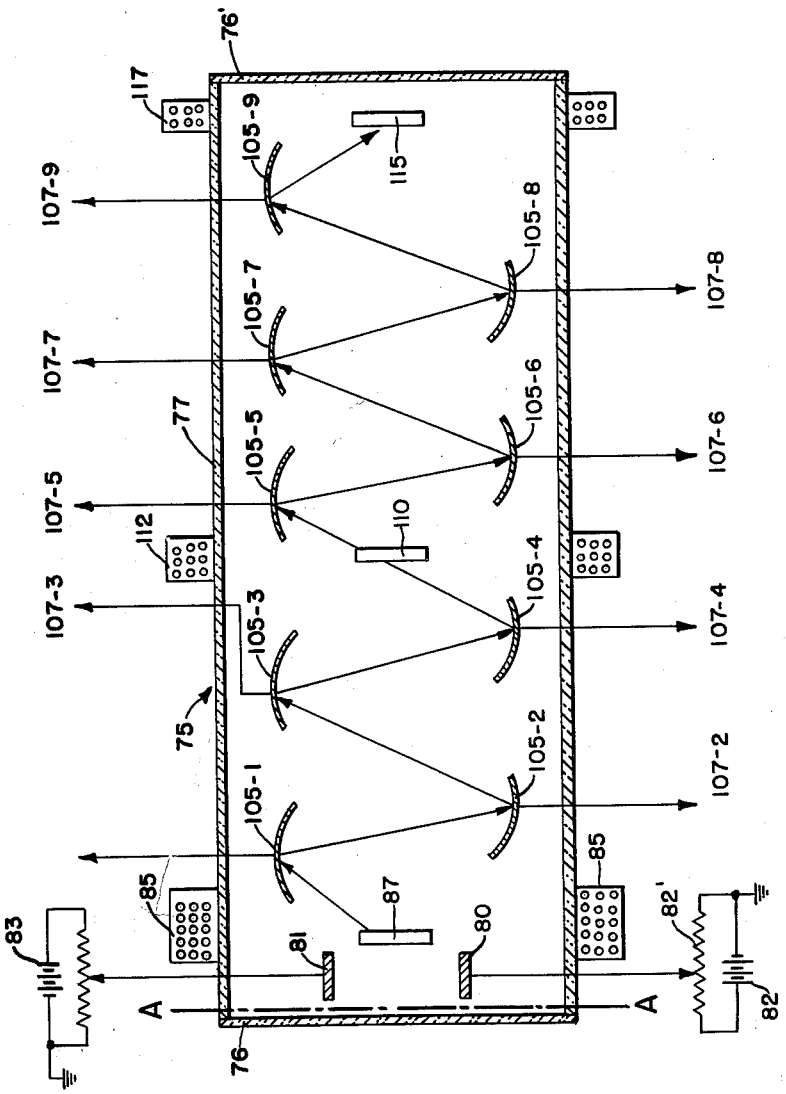
FIGURE 2 is a cross sectional partially schematic view of the remainder of the system.

In order to describe the production of the visible image, reference is made to FIGURE 2 which shows one form of image tube used for this purpose. Located adjacent the specimen slide 62 is a small neon or fluorescent tube 70. The tube 70 has in it a gas which is ionized by the electromagnetic radiation produced from the antenna 64 and the radiation emanating and spilling over from the specimen. The fluorescent tube 70 acts as a test lamp to tell when the system is operating by producing a visible light.

The modulated visible and ultra-violet light from the specimen as well as the higher frequencies of energy, pass through a lens system 72 to the image tube 75. The lens system 72 is preferably made of quartz or some other material and serves to pass the visible light from the primary source tube 11 after it has been modified by the other frequencies of energy present and by the energy emitted from the specimen. As is well known, quartz lenses can pass wavelengths greater than 0.19 micron. Shorter wavelengths of radiation, such as the alpha, beta, and gamma waves and the shorter wavelengths radiated by the specimen pass around the lens system 72 to the image tube 75. All of the radiation then passes to the internal components of the image tube 75 through a thin quartz window 76 which is placed at one end of the housing wall 77 of the image tube.

Located adjacent the quartz window 76 is a set of deflection plates 80, 81, which are preferably formed of the same type of material as corresponding respective deflecting plates 39, 40 of tube 11. Deflection plates 80, 81 are connected to a suitable source of deflecting potential formed by respective voltage divider circuits 82, 82' and 83, 83'. Also located adjacent the window 76 is a deflecting coil 85 which is wound around the outside of the image tube 75 and connected to suitable source of focussing current (not shown).

The potentials on the deflecting plates 80, 81 and the current in the focussing coil 85 are so adjusted that these elements concentrate the respective wavelengths and particles of energy on which they are effective onto a first image producing and correcting screen 87. The screen 87 is mounted by any suitable arrangement (not shown) and its details of construction are shown in FIGURES 3A and 3B.

Referring to FIGURES 3A and 3B the screen 87 is formed by first and second sections 90 and 91, which are similar, but not identical in construction. Each of the sections 90 and 91 is constructed of a plate 93 which is preferably of quartz or mica with a plurality of holes 95 in it. The holes 95 are either etched, drilled or punctured through the plate 93 and their diameter should be as small as possible. In a preferred form of the invention, the plate 93 is made of mica and the holes 95 are punctured by means of a high voltage arc. The holes 95 should be as close together as possible and a symmetrical, preferably line by line, arrangement is desirable. This is shown in FIGURE 3A.

The plate 93 is coated with a metal silicate 96 which is also punctured during the formation of the holes 95. A phosphor screen 99 is evaporated onto the plates 93 by any of the suitable techniques well known in the field of forming cathode ray tube screens. During the evaporation process, the phosphors also deposit on the inside of the holes 95, but do not block the holes. The phosphors utilized for the screen 99 are a mixture of those phosphors which would normally emit the full color spectrum, as determined by the primary emission or the complements of these colors. As is well known, the color of light emitted by a particular phosphor is dependent on the wavelength of the energy impinging upon it. This is shown in any pertinent reference text. Suitable phosphors may be selected to suit a particular application or specimen being examined, it having been determined that each specimen will emit most strongly one frequency of energy or narrow band of frequencies. The phosphors are selected to maximize the reproduction of this frequency or band of frequencies. Mixed in with the phosphors forming the screen 99 are radioactive particles which emit alpha, beta and gamma rays which serve to sharpen the reproduced image. If desired, the phosphors are baked over with gold or silver for physical support.

The first section 90 is turned as shown in FIGURE 3B toward the direction of the incident rays of energy coming into the image tube 75. The quartz plate 93 is covered with a black matt coating 101 which is semi-transparent. The second section 91 of the screen is reversed with respect to the first section and aligned, either directly on top of or spaced slightly therefrom, so that the holes 95 have only their edges overlapping (see FIGURE 3A). An arrangement such as this may be readily accomplished, simply by puncturing the holes for the plates 93 of the first and second sections at the same time and then shifting one plate with respect to the other to achieve the desired hole alignment. For best resolution of the finished picture, the overlap between the holes 95 of the first and second sections should be made as small as possible thereby forming only very narrow slits through which any radiation can pass to the remainder of the tube.

To illustrate the operation of the screen 87, consider several incident rays of energy, shown in FIGURE 3B. The ray 102 is in line with a slit formed by the overlapping of two holes 95 and passes therethrough. Since this is the case, the ray 102 will not excite any of the phosphors. When the ray 102 is in the visible light range, the light ray 102 will also pass through the slit. A second ray of high frequency energy 103 approaches the first section 90 of the screen at a slight angle and impinges on the phosphors in the hole 95. The phosphor then emits light of a color dependent upon the characteristics of the phosphor struck and the wavelength of the impinging energy. This emitted light passes through the narrow slit and out the other side of the second section 91. When a beam of light such as 103 strikes the phosphor on the hole 95 of section 90, some of it is also reflected in the same manner as that shown.

Therefore, due to the interaction between the phosphor coating 99, the holes 95, and the overlapping edges and very narrow slits formed thereby, the impinging high frequency radiation, which has the pattern of the specimen being examined as modulated onto the visible radiation passing through and around the specimen, forms a finely resolved optical image. Any high frequency radiation which was not absorbed by the phosphors and converted into light, such as rays 102, passes through to the remainder of the tube.

Some of the light from the second section 91, which passed through the narrow slits formed by the overlapping holes 95, is radiated upwardly toward the first reflecting electrode 105–1 of a series of metal reflecting electrodes 105–1 through 105–9. Actually, the image produced by the examination of the specimen is present here but it has shadows and other defects which are corrected by other tube elements, as will be described.

Each of the reflecting electrodes 105–1 through 105–9 is a metal mirror, which is highly polished and preferably slightly concave in shape. The reflecting electrodes 105–1 through 105–9 are positioned with respect to one another so that the image appearing on one reflecting electrode is reflected to the next successive electrode. In placing the electrodes in the tube 75, they are first made adjustable with respect to one another so that the best positioning of each electrode may be obtained. In order finally to position the electrodes, a visible light is placed at the input side of the tube and the electrodes are positioned until maximum output brilliance is obtained at the other end. In view of the narrow slits formed by the overlapping holes, the image tube 75 operates in many respects like an optical monochromator, with a long optical path length being formed by the successive reflections of the optical image from reflecting electrodes 105–1 through 105–9.

Leads 107–1 through 107–9 are connected to a respective electrode 105–1 through 105–9 and brought out through a suitable seal (not shown) in the envelope 77 of the tube. The leads are connected to tap on a voltage divider (not shown) which are respectively more positive with respect to one another. In a preferred form of the invention, an inter-electrode voltage difference of about 18 volts or more is maintained between successive electrodes. Therefore, electrode 105–9 is charged 144 volts more positive than electrode 105–1. The electrodes 105–1 through 105–9 effectively serve to attract and collect charged particles which are inside the tube 75. They may, in effect, be considered a filter, to filter out these particles.

The image is reflected from successive electrodes 105–1, 105–2, 105–3 and 105–4. After being reflected from electrode 105–4, the image passes through a second screen 110 which is located between reflecting electrodes 105–4 and 105–5 and which is similar in construction to the first screen 87 (FIGURE 3). However, in screen 110, no radioactive particles are used. Screen 110 is also slightly offset from screen 87, so that the hole pattern does not match: This tends to make more of the remaining high frequency strike a phosphor. A magnetic focussing coil 112 is placed around the envelope 77 so as to focus the radiation at the screen 110 onto it. The focussing coil 112 is supplied current from a suitable source (not shown). The radiation which was not converted to light by the first screen 87 impinges on the second screen 110 and some of it is converted into visible light by the primary color phosphors. Since the radiation pattern passing through the first screen 87 still preserves the configuration of the image of the specimen, the light pattern formed by the second screen 110 reinforces that formed by the first screen 87. The optical image is further resolved at the screen 110 due to the narrow slits which are formed by the overlapping hole configuration.

The optical image which is formed at screen 110 is directed upward to the next reflecting electrode 105–5 and reflected onto successive electrodes 105–6, 105–7, 105–8 and 105–9. From the last reflecting electrode 105–9, the image now focusses onto a third screen which is similar in construction to the screen 110, i.e., the same as screen 87 without the radioactive particles. The final optical image is formed at the side of screen 115 adjacent the quartz window 67'. It should be realized that since most of the invisible high frequency radiation will have been converted into light energy by the screens 87 and 110, that the phosphor particles coated onto screen 110 serve a rather limited use. However, if any invisible high frequency radiation is present there, it is converted into light energy by the phosphors. A focussing coil 117 is placed around the envelope 70 of the tube 75 surrounding the screen 115, for the purpose of focussing this invisible radiation. The narrow slits of screens 110, as formed by the overlapping holes 95, serve further to resolve the optical image.

It should be realized that any suitable optical correcting devices may be utilized in order to reflect or bend an optical image through a desired angle. For example, prisms may be used in conjunction with the screens 87, 110, and 115 in order to focus the optical image onto the reflecting electrodes or finally onto the output window 76'.

The final image appearing at the output of the screen 115 is passed through the quartz window 76' where it may be viewed through a suitable lens system or projected onto the screen. If desired, photographic equipment may be utilized at the window 76' along with any suitable filters to take a picture of the image. Television equipment, color or black and white, may also be used.

Operating a microscope constructed in accordance with the principles of the invention, many different types of specimens have been examined and photographed. One such specimen was magnesium which was examined in the following manner. A piece of magnesium was first filed down to get small metal filing which were placed between quartz cover slides and mounted adjacent the condenser 49. The magnesium filings were then bombared with the plurality of radiant energies from the various sources previously discussed. With energies of wavelengths in the order of 5 Angstroms produced by the tube 11; in the order 0.9–0.01 Angstroms produced by the radioactive guns 27, 56 and 57; and in the order of 280 megacycles by the oscillator 52, directed onto the specimen, pictures of the internal, crystal-like structure of the magnesium were obtained.

Although a particular structure has been described, it should be understood that the scope of the invention should not be considered to the limited by the particular embodiment of the invention shown by way of illustration, but rather by the appended claims.

What is claimed is:

1. In a microscope for the examination of a specimen the combination including a plurality of sources for simultaneously producing electromagnetic energies of different character in the range including the frequency band from ultra-violet down to and including the radio frequency range and for producing energy in the form of alpha, beta and gamma rays, the various energies being directed onto said specimen whereby said specimen emits radiation which is characteristic of its nature, said radiation emitted by said specimen modulating the other energies to form a composite radiation pattern, and means for converting said composite radiation pattern into a visible image.

2. In a microscope for the examination of a specimen the combination including a plurality of sources for producing simultaneously electromagnetic energies including energy into the visible light range and energy in the form of alpha, beta and gamma rays, the various energies being directed onto said specimen, means for producing radio frequency energy, means for modulating said radio frequency energy onto certain ones of the other energies directed onto said specimen, means for also directing said ratio frequency energy onto said specimen whereby said specimen emits radiation which is characteristic of its nature, said radiation emitted by said specimen modulating the other energies to form a composite radiation pattern, and means for coverting said composite pattern into a visible image.

3. In a microscope for the examination of a specimen the combination including a plurality of sources for producing simultaneously electromagnetic energies of different character in the range including the frequency band from ultra-violet down to and including the radio frequency range and energy in the form of alpha, beta and gamma rays, the various energies being directed onto said specimen whereby said specimen emits radiation which is characteristic of its nature, said radiation emitted by said specimen modulating the other energies to form a composite radiation pattern containing radiant energy of a plurality of frequencies both in the visible and invisible ranges, an image forming device for converting said composite radiation pattern into a visible image, said image forming device comprising a plurality of screens, each of said screens being formed to allow radiation of a frequency in the visible range to pass therethrough and with a material which produces visible light in response to radiation of frequencies in the invisible range thereby forming a visible image, said screens being located in optical alignment within said device, and optical means for focussing the visible image produced by one screen onto another screen.

4. In a microscope for the examination of a specimen the combination including a plurality of sources for producing simultaneously electromagnetic energies of different character in the range including the frequency band from ultra-violet down to and including the radio frequency range and for producing energy in the form of alpha, beta and gamma rays, the various energies being directed onto said specimen whereby said specimen emits radiation which is characteristic of its nature, said radiation emitted by said specimen modulating the other energies to form a composite radiation pattern containing radiant energy of a plurality of frequencies both in the visible and invisible ranges, an image forming device for converting said composite radiation pattern into a visible image, said image forming device comprising a screen, said screen formed by a plurality of sections having holes therein in a predetermined arrangement, said sections being located with respect to each other so that said holes only partially overlap to form narrow slits, a phosphor coating on said sections and the edges of said holes thereof for emitting visible light of a color dependent upon the characteristics of the phosphors forming said coating and the frequency of the radiation impinging thereon, means for directing said plurality of frequencies of energy onto said screen to excite said phosphors to emit visible light, said emitted visible light and said visible energy passing through the narrow slits formed by said overlapping holes thereby forming an image which is characteristic of said pattern.

5. In a microscope for the examination of a specimen the combination including a plurality of sources for producing simultaneously electromagnetic energies of different character in the range including the frequency band from ultra-violet down to and including the radio frequency range and for simultaneously producing energy in the form of alpha, beta and gamma rays, the various energies being directed onto said specimen, means for producing radio frequency energy, means for modulating said radio frequency energy onto certain ones of the other energies directed onto said specimen, means for also directing said radio frequency energy onto said specimen whereby said specimen emits radiation which is characteristic of its nature, said radiation emitted by said specimen modulating the other energies to form a composite radiation pattern containing radiant energy of a plurality of frequencies both in the visible and invisible ranges, an image forming device for converting said composite radiation pattern into a visible image, said image forming device comprising a plurality of screens, each of said screens being formed to allow radiation of a frequency in the visible range to pass therethrough and with a material which produced visible light in response to radiation of frequencies in the invisible range thereby forming a visible image, said screens being located in optical alignment within said device, and optical means for focussing the visible image produced by one screen onto another screen.

6. In a microscope for the examination of a specimen the combination including a plurality of sources for producing simultaneously electromagnetic energies of different character in the range including the frequency band from ultra-violet down to and including the radio frequency range and for simultaneously producing electromagnetic energy in the form of alpha, beta and gamma rays, the various energies being directed onto said specimen, means for producing radio frequency energy, means for modulating said radio frequency energy onto certain ones of the other energies directed onto said specimen, means for also directing said radio frequency energy onto said specimen whereby said specimen emits radiation which is characteristic of its nature, said radiation emitted by said specimen modulating the other energies to form a composite radiation pattern containing radiant energy of a plurality of frequencies both in the visible and the invisible ranges, an image forming device for converting said composite radiation pattern into a visible image, said image forming device comprising a screen, said screen formed by a plurality of sections having holes therein in a predetermined arrangement, said sections being located with respect to each other so that said holes only partially overlap to form narrow slits, a phosphor coating on said sections and the edges of said holes thereof for emitting visible light of a color dependent upon the characteristics of the phosphors forming said coating and the frequency of the radiation impinging thereon, means for directing the plurality of modulated energies onto said screen to excite said phosphors to emit visible light, said emitted visible light and said visible energy passing through the narrow slits formed by said overlapping holes thereby forming an image which is characteristic of said pattern.

7. In a microscope for the examination of a specimen the combination including a plurality of sources for producing simultaneously electromagnetic energies of different frequencies in the range including the frequency band from ultra-violet down to and including the radio frequency range and for simultaneously producing electromagnetic energy in the form of alpha, beta and gamma rays, the various energies being directed onto said specimen whereby said specimen emits radiation which is characteristic of its nature, said radiation emitted by said specimen modulating the other energies to form a composite radiation pattern containing radiant energy of plurality of frequencies both in the visible and invisible ranges, an image forming device for converting said composite radiation pattern into a visible image, said image forming device comprising a screen, said screen formed by a plurality of sections having holes therein in a predetermined arrangement, said sections being located with respect to each other so that said holes only partially overlap to form narrow slits, a phosphor coating on said sections and the edges of said holes thereof for emitting visible light of a color dependent upon the characteristics of the phosphors forming said coating and the frequency of the radiation impinging thereon, means for directing said plurality of energies of different frequency onto said screen to excite said phosphors to emit visible light, said emitted visible light and said visible energy passing through the narrow slits formed by said overlapping holes thereby forming an image which is characteristic of said pattern.

8. An image forming device for converting into a visible image a plurality of frequencies of incoming radiant energy in the visible and invisible frequency range which are characteristic of a specimen comprising a plurality of screens, each of said screens being formed to allow radiation of a frequency in the visible range to pass therethrough and with a material which produced visible light in response to radiation of frequencies in the invisible range thereby forming a visible image, said screens being located in optical alignment within said device, and optical means for focussing the visible image produced by one screen onto another screen.

9. An image forming device for converting a plurality of frequencies of incoming radiant energy both in the visible and the invisible ranges and containing information of the pattern of an object comprising a screen, said screen formed by a plurality of sections having holes therein in a predetermined arrangement, said sections being located with respect to each other so that said holes only partially overlap to form narrow slits, a phosphor coating on said sections and the edges of said holes thereof for emitting visible light of a color dependent upon the characteristics of the phosphors forming said coating and the frequency of the radiation impinging thereon, means for directing said plurality of frequencies of energy onto said screen to excite phosphors to emit visible light, said emitted visible light and said visible energy passing through the narrow slits formed by said overlapping holes thereby forming an image which is characteristic of said pattern.

10. An image forming screen comprising first and second plates, said plates having holes therein in a predetermined arrangement, each of said plates and the edges of the holes therein being coated with a phosphor composition which emits light of various colors in response to radiation, said plates being located with respect to each other so that said holes overlap to form narrow slits.

11. An image forming screen as set forth in claim 10 wherein said plates are made of quartz.

12. An image forming screen as set forth in claim 10 wherein said plates are made of mica.

13. An image forming screen as set forth in claim 10 wherein said coating also contains radioactive particles.

14. An image forming device for converting a plurality of frequencies of incoming radiant energy both in the visible and invisible ranges and containing information of the pattern of an object comprising a screen, said screen formed by a plurality of sections having holes therein in a predetermined arrangement, said sections being located with respect to each other so that said holes only partially overlap to form narrow slits, a phosphor coating on said sections and the edges of said holes thereof for emitting visible light of a color dependent upon the characteristic of the phosphor forming said coating and the frequency of the energy impinging thereon, means for directing said plurality of frequencies of energy onto said screen to excite said phosphors to emit visible light, said emitted visible light and said visible energy passing through the narrow slits formed by said overlapping holes thereby forming an image which is characteristic of said pattern, a first reflecting element onto which said image is directed, a plurality of other reflecting elements which are located within said device to successively focus the image from said first reflecting element onto said other reflecting elements, a second screen located in the optical path of one of said reflecting elements and in the path of the incoming radiation which passes through and is emitted by said first screen, said second screen being similar in construction to said first named screen, the incoming radiation impinging thereon exciting the phosphors on said second screen to emit visible light, said visible light emitted by said second screen and said visible light from said incoming radiation and said image reflected from said reflecting element passing through the slits of said second screen formed by the overlapping holes therein and combining to form an image which is characteristic of said pattern.

15. An image reproducing device as set forth in claim 14 wherein the phosphor coating has radioactive particles therein.

16. An image reproducing device as set forth in claim 14 wherein said reflecting elements are made of conductive material and each of said elements is connected to a potential source.

17. An image reproducing device as set forth in claim 14 wherein each successive element is respectively connected to a respectively higher potential.

18. In a microscope for the examination of a specimen the combination comprising a plurality of means for simultaneously producing electromagnetic energies of different frequencies in the range including the frequency band from ultra-violet down to and including the radio frequency range and for producing electromagnetic energy in the form of alpha, beta and gamma rays, the energy producing means being located with respect to said specimen so that the various energies are directed onto said specimen whereby said specimen emits radiation which is characteristic of its nature, said radiation emitted by said specimen modulating the other energies to form a composite radiation pattern.

References Cited in the file of this patent

UNITED STATES PATENTS

| | | |
|---|---|---|
| 2,894,160 | Sheldon | July 7, 1959 |
| 2,928,943 | Bartz et al. | Mar. 15, 1960 |
| 2,938,141 | Garbuny et al. | May 24, 1960 |

FOREIGN PATENTS

| | | |
|---|---|---|
| 760,523 | Great Britain | Oct. 31, 1956 |